(12) United States Patent
Okino et al.

(10) Patent No.: US 10,914,629 B2
(45) Date of Patent: Feb. 9, 2021

(54) IMAGING SYSTEM, AND METHOD FOR SPECIFYING UV EMISSION LOCATION USING SAME

(71) Applicant: PANASONIC INTELLECTUAL PROPERTY MANAGEMENT CO., LTD., Osaka (JP)

(72) Inventors: Toru Okino, Osaka (JP); Yutaka Hirose, Kyoto (JP); Seiji Yamahira, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/577,311

(22) Filed: Sep. 20, 2019

(65) Prior Publication Data

US 2020/0018641 A1 Jan. 16, 2020

Related U.S. Application Data

(63) Continuation of application No. PCT/JP2018/005216, filed on Feb. 15, 2018.

(30) Foreign Application Priority Data

Mar. 21, 2017 (JP) ................. 2017-054659

(51) Int. Cl.
*G01J 1/42* (2006.01)
*G01J 1/04* (2006.01)

(52) U.S. Cl.
CPC .............. *G01J 1/429* (2013.01); *G01J 1/0411* (2013.01); *G01J 1/0448* (2013.01)

(58) Field of Classification Search
CPC ........ G01J 1/429; G01J 1/0448; G01J 1/0411; G01J 3/443; G01J 1/4228; G01J 3/0208;
(Continued)

(56) References Cited

U.S. PATENT DOCUMENTS 4,578,583 A * 3/1986 Ciammaichella ....... F23N 5/082
250/372
4,736,105 A 4/1988 Fonnesbeck

FOREIGN PATENT DOCUMENTS

JP   1-152377 A   6/1989
JP   8-128916 A   5/1996
(Continued)

OTHER PUBLICATIONS

Liew ("Electromagnetic Waves", 2001, https://crisp.nus.edu.sg/~research/tutorial/em.htm). (Year: 2001).*
(Continued)

*Primary Examiner* — David P Porta
*Assistant Examiner* — Meenakshi S Sahu
(74) *Attorney, Agent, or Firm* — Westerman, Hattori, Daniels & Adrian,

(57) ABSTRACT

An imaging system includes: an image sensor sensitive to ultraviolet light and visible light; a lens configured to focus light from a subject onto the image sensor; and an image processor configured to process image signals output from the image sensor. The image processor obtains the difference between image signals A1 and A2 output from the image sensor at times t1 and t2, respectively. If the differential signal A3 is greater than or equal to a predetermined value, the image processor determines that light from the subject contains the ultraviolet light, and generates an image signal CI based on the differential signal A3.

18 Claims, 4 Drawing Sheets

(58) Field of Classification Search
CPC .......... G01J 3/0237; G01J 3/32; G01N 21/33; G01N 21/8806
See application file for complete search history.

(56) References Cited

FOREIGN PATENT DOCUMENTS

| | | |
|---|---|---|
| JP | 2000-99847 A | 4/2000 |
| JP | 2006-267097 A | 10/2006 |
| JP | 2012-18621 A | 1/2012 |
| JP | 2004-81735 A | 3/2019 |
| WO | 00/05536 A1 | 2/2000 |

OTHER PUBLICATIONS

International Search Report dated May 1, 2018, issued in counterpart International Application No. PCT/JP2018/005216 (2 pages).

\* cited by examiner

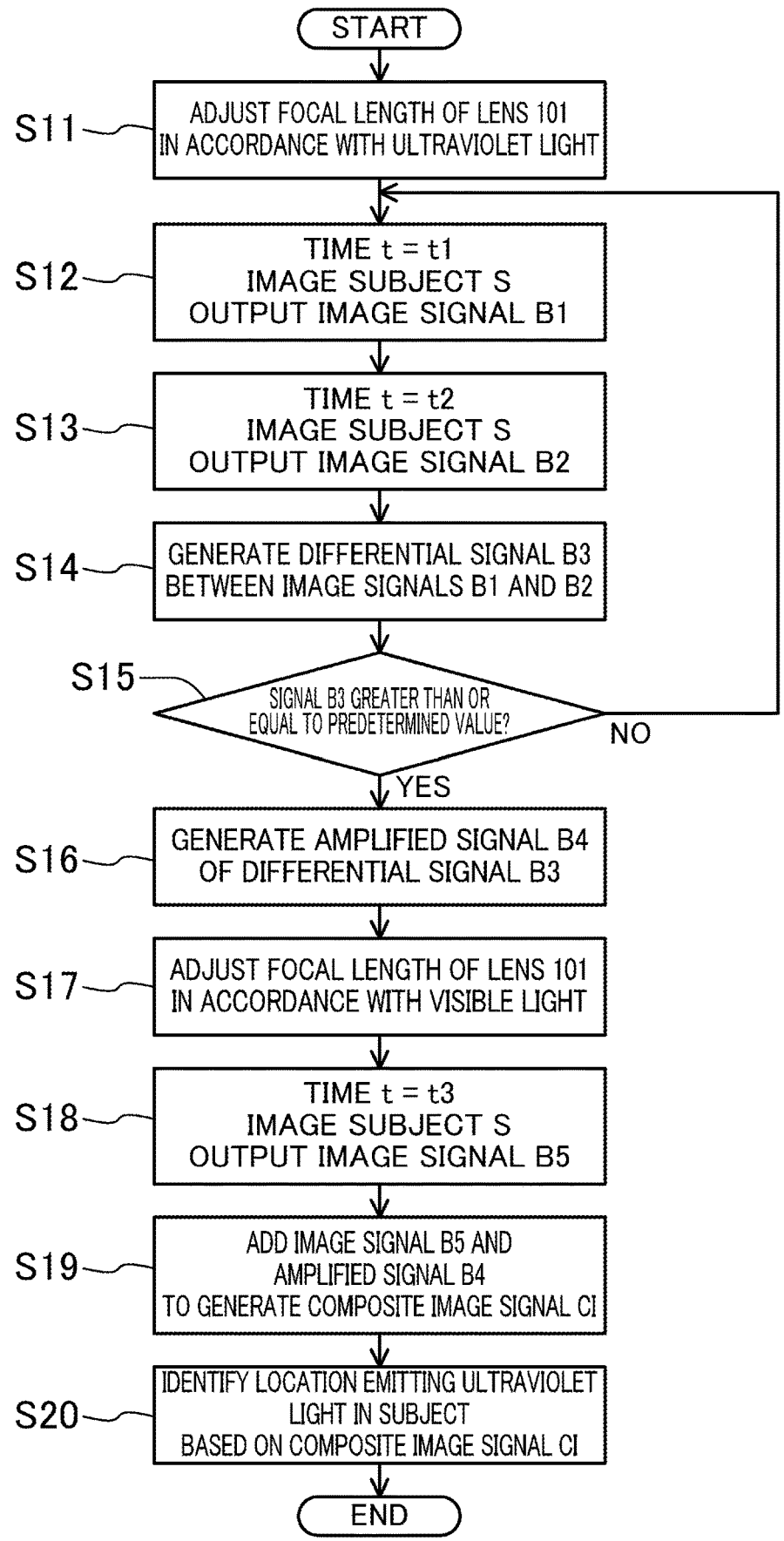

IMAGING SYSTEM, AND METHOD FOR SPECIFYING UV EMISSION LOCATION USING SAME

CROSS-REFERENCE TO RELATED APPLICATIONS

This is a continuation of International Application No. PCT/JP2018/5216 filed on Feb. 15, 2018, which claims priority to Japanese Patent Application No. 2017-054659 filed on Mar. 21, 2017. The entire disclosures of these applications are incorporated by reference herein.

BACKGROUND

The present invention relates to an imaging system capable of imaging weak ultraviolet light outdoors or under an illumination environment to identify the location generating the weak ultraviolet light, and a method of identifying the location emitting the weak ultraviolet light using the imaging system.

A technique has been suggested (see e.g., Japanese Unexamined Patent Publication No. H1-152377, hereinafter referred to as Patent Document 1), which simultaneously takes ultraviolet light with a wavelength shorter than 400 nm and visible light much weaker than the ultraviolet light into an ultraviolet light imaging means, while observing the background with eyes, to detect partial discharge. In an attempt to detect the weak ultraviolet light with naked eyes under external light or illumination, for example, illumination light may be an obstacle. The weak visible light is thus taken in at the same time as the ultraviolet light to confirm the background based on the visible light. With respect to a photoelectric conversion member described in Patent Document 1, the quantum efficiencies for the visible light with the shortest wavelength (i.e., 400 nm) and a wavelength of 460 mm are lower than that for the ultraviolet light by two and five orders of magnitude, respectively (see FIG. 1 of Patent Document 1).

SUMMARY

However, a dedicated filter for cutting visible light is required to detect weak ultraviolet light under illumination containing the visible light, which increases the price of the device. The known art disclosed in Patent Document 1 largely reduces the sensitivity of the photoelectric conversion member to the visible light as described above to detect the weak ultraviolet light under illumination containing the visible light. If the visible light has an insufficient intensity, the background can be confirmed insufficiently, which leads to difficulty in identifying the location emitting the weak ultraviolet light. In addition, the photoelectric conversion member detects only light in a blue band (i.e., with a wavelength around 400 nm) as the visible light, and is not sensitive to light in green and read bands with wavelengths longer than the above-mentioned wavelength. The problem is therefore that the known art is applicable only to limited illumination conditions.

The present invention was made in view of the problem. It is an objective of the present invention to provide an imaging system capable of detecting weak ultraviolet light without degrading the sensitivity to background visible light to identify the location emitting the ultraviolet light, and a method of identifying the location emitting the ultraviolet light.

In order to achieve the objective, the present invention calculates the difference between image signals acquired at different times to obtain an image signal associated with the ultraviolet light.

Specifically, an imaging system according to the present invention includes: an image sensor sensitive to ultraviolet light and visible light; a lens configured to focus light from a subject onto the image sensor; and an image processor configured to process image signals output from the image sensor. The image processor acquires a differential signal between an image signal output from the image sensor at a first time and an image signal output from the image sensor at a second time, determines that the differential signal contains a signal associated with the ultraviolet light if the differential signal is greater than or equal to a predetermined value, and generates a first image signal based on the differential signal.

With this configuration, if the difference between the image signals acquired at the different times is greater than or equal to the predetermined value, it is determined that the differential signal contains the signal associated with the ultraviolet light, and the first image signal is generated based on the difference. This allows for detection of even weak emission of the ultraviolet light from the subject.

In one preferred embodiment, the image processor further generates a first composite image signal of the image signal output from the image sensor at the first time and the first image signal or an amplified first image signal.

This configuration allows for acquisition of, for example, the outline of the subject from the image, which mainly contains the visible light. From the outline and the image associated with the ultraviolet light, the location emitting the ultraviolet light can be identified in the subject.

In one preferred embodiment, the imaging system further includes a focus controller configured to control a position of the lens to adjust a focal length of the lens with respect to light with different wavelengths. The focus controller controls the position of the lens to match the focal length of the lens to the ultraviolet light at the first and second times, and controls the position of the lens to match the focal length of the lens to the visible light at a third time. The image processor further generates a second composite image signal of an image signal output from the image sensor at the third time and the first image signal or an amplified first image signal.

This configuration allows for acquisition of clear images associated with the ultraviolet and visible light, which leads to more reliable identification of the light-emitting location. In addition, the S/N ratio of the image associated with the ultraviolet light is improved to provide a clearer image signal.

In one preferred embodiment, the imaging system further includes a display configured to display an image of the subject based on the first or second composite image signal.

A method of identifying a location emitting ultraviolet light using an imaging system including at least: an image sensor sensitive to ultraviolet light and visible light; a lens configured to focus light from a subject onto the image sensor; and an image processor configured to process image signals output from the image sensor. The method includes: imaging a subject to acquire ones of the image signals at a first time and a second time using the image sensor; obtaining a differential signal between the ones of the image signals acquired at the first and second times using the image processor; determining whether or not the differential signal is greater than or equal to a predetermined value using the image processor; determining that the differential signal contains a signal associated with the ultraviolet light if the differential signal is greater than or equal to a predetermined value; generating a first image signal based on the differential signal containing the signal associated with the ultraviolet light using the image processor; and identifying the location emitting the ultraviolet light in the subject using the image processor, based on the first image signal.

With this method, if the difference between the image signals acquired at the different times is greater than or equal to the predetermined value, it is determined that the differential signal contains the signal associated with the ultraviolet light, and the first image signal is generated based on the difference. This allows for detection of even weak emission of the ultraviolet light from the subject. The identification of the location emitting the ultraviolet light leads to detection of, for example, a malfunction in a facility.

In one preferred embodiment, the location emitting the ultraviolet light is identified in the subject using the image processor, based on a first composite image signal of the first image signal or an amplified first image signal and the one of the image signals acquired at the first time.

This method allows for acquisition of, for example, the outline of the subject from the image, which mainly contains the visible light. From the outline and the image associated with the ultraviolet light, the location emitting the ultraviolet light is identified in the subject, which leads to detection of, for example, a malfunction in a facility.

In one preferred embodiment, the method further includes: adjusting a position of the lens to match a focal length of the lens to the ultraviolet light at the first and second times; adjusting the position of the lens to match the focal length of the lens to the visible light at a third time; and imaging the subject to acquire an image signal at the third time using the image sensor. The location emitting the ultraviolet light is identified in the subject using the image processor, based on a second composite image signal of the first image signal or an amplified first image signal and the image signal acquired at the third time.

This method allows for acquisition of clear images associated with the ultraviolet and visible light, which leads to more reliable identification of the light-emitting location. In addition, the S/N ratio of the image associated with the ultraviolet light is improved to provide a clearer image signal. This leads to more reliable identification of the light-emitting location in the subject.

The imaging system according to the present invention allows for detection of weak ultraviolet light and background visible light, without degrading the sensitivity to the background visible light. The imaging system outputs an image with a high S/N ratio with respect to the ultraviolet light. The method of identifying the location emitting ultraviolet light according to the present invention allows for detection of weak ultraviolet light from a subject outdoors or under an artificial illumination environment to clearly identify the location emitting the ultraviolet light.

BRIEF DESCRIPTION OF THE DRAWINGS

FIG. 4 is a flowchart for identifying the location emitting ultraviolet light according to the second embodiment.

DETAILED DESCRIPTION

Embodiments of the present disclosure will now be described in detail with reference to the drawings. The following description of advantageous embodiments is only examples in nature, and is not intended to limit the scope, applications or use of the present invention.

First Embodiment

Figure 1:
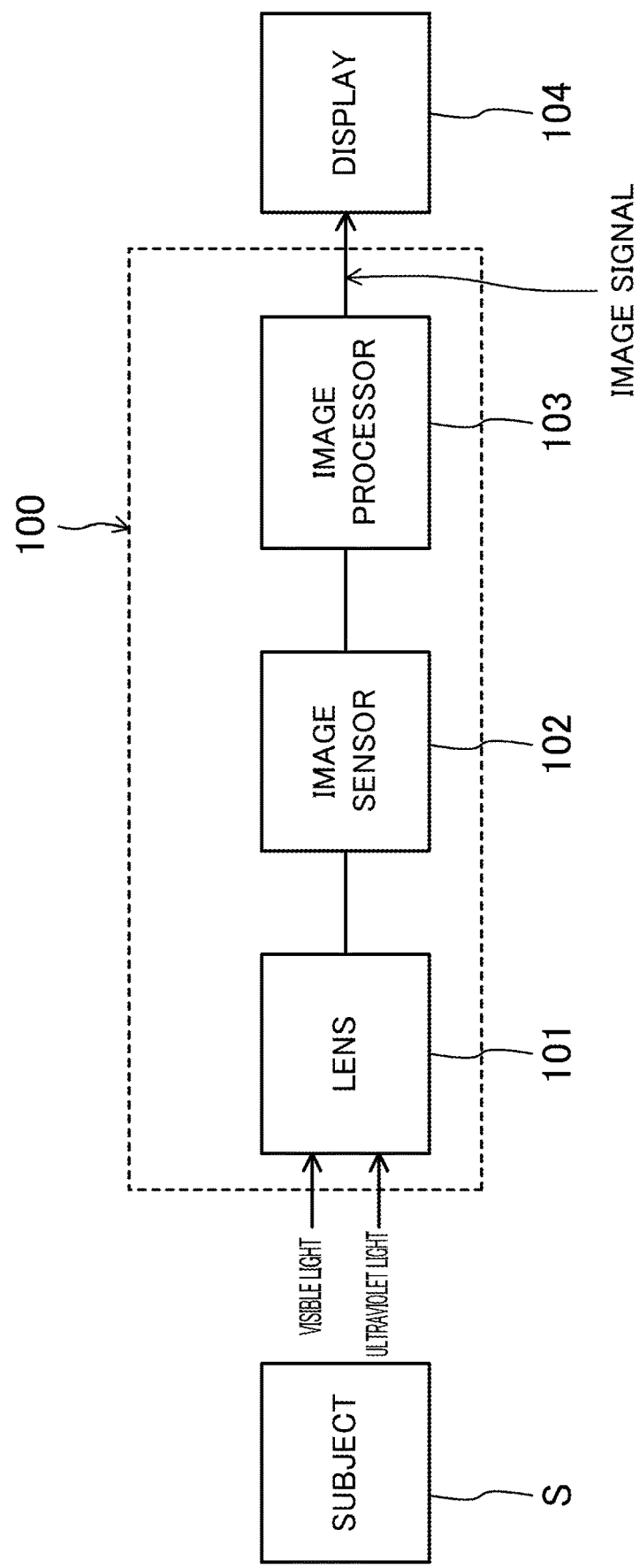
FIG. 1 is a functional block diagram of an imaging system according to a first embodiment of the present invention.

FIG. 1 is a functional block diagram of an imaging system according to this embodiment. The imaging target of this imaging system 100 is ultraviolet light and visible light. In this specification, the ultraviolet light has a wavelength within a range from 200 nm (inclusive) to 400 nm (exclusive), while the visible light has a wavelength within a range from 400 nm to 700 nm. Alternatively, the ultraviolet light may have a wavelength within a range from 300 nm to 380 nm, while the visible light may have a wavelength within a range from 400 nm to 650 nm.

The imaging system 100 includes a lens (condenser) 101, an image sensor 102, and an image processor 103. The lens 101 collects light from a subject S. The image sensor 102 receives the light collected by the lens 101, and performs photoelectric conversion. The image processor 103 processes signals output from the image sensor 102.

The lens 101 is made of high-purity glass such as quartz, or a resin material such as acrylic, to transmit not only visible light but also ultraviolet light. The image sensor 102 has a photoelectric conversion film (not shown) with predetermined sensitivities to both the ultraviolet light and visible light. The photoelectric conversion film is made of, for example, silicon or an organic material.

The image processor 103 that processes the signals output from the image sensor 102 is, for example, a digital signal processor (DSP), a field programmable gate array (FPGA) or a combination thereof. The image processor 103 functions to store signals output from pixels of the image sensor 102, and performs arithmetic processing. The image processor 103 also functions to output the signals output from the image sensor 102 and subjected to arithmetic processing as image signals.

A display 104 receives the image signals output from the image processor 103, and displays the image signals as images. The display 104 may be, for example, a liquid crystal monitor or a monitor using an organic EL panel. The display 104 may be incorporated into the imaging system 100.

The imaging system 100 may be provided, for example, in a vehicle moving in a predetermined place. The imaging system 100 may also be hand-carried and portable. In one more preferred embodiment, the imaging system 100, particularly the lens 101 and the image sensor 102, may be fixed in a predetermined position. Since the background does not change largely when the subject is periodically imaged, a target signal component contained in a differential signal is easily extracted in a flow of identifying the light-emitting location, which will be described later. The signals may be transmitted between the image sensor 102 and the image processor 103 and between the image processor 103 and the display 104 not only by wire but also via wireless communication equipment (not shown).

This embodiment assumes the imaging conditions, for example, where hydrogen leaked from a high-pressure hydrogen pipe of an outside hydrogen station burns. The flame of the burning hydrogen emits ultraviolet light, which has, however, a lower intensity than background visible light. In addition, human eyes are not sensitive to ultraviolet light. It is thus usually difficult to detect the emission of the flame of the burning hydrogen with naked eyes.

To address the problem, this embodiment employs the image sensor 102 with the predetermined sensitivities to both the ultraviolet light and visible light. The image sensor 102 calculates the difference between the image signals at different times to obtain an image signal associated with the ultraviolet light.

Figure 2:
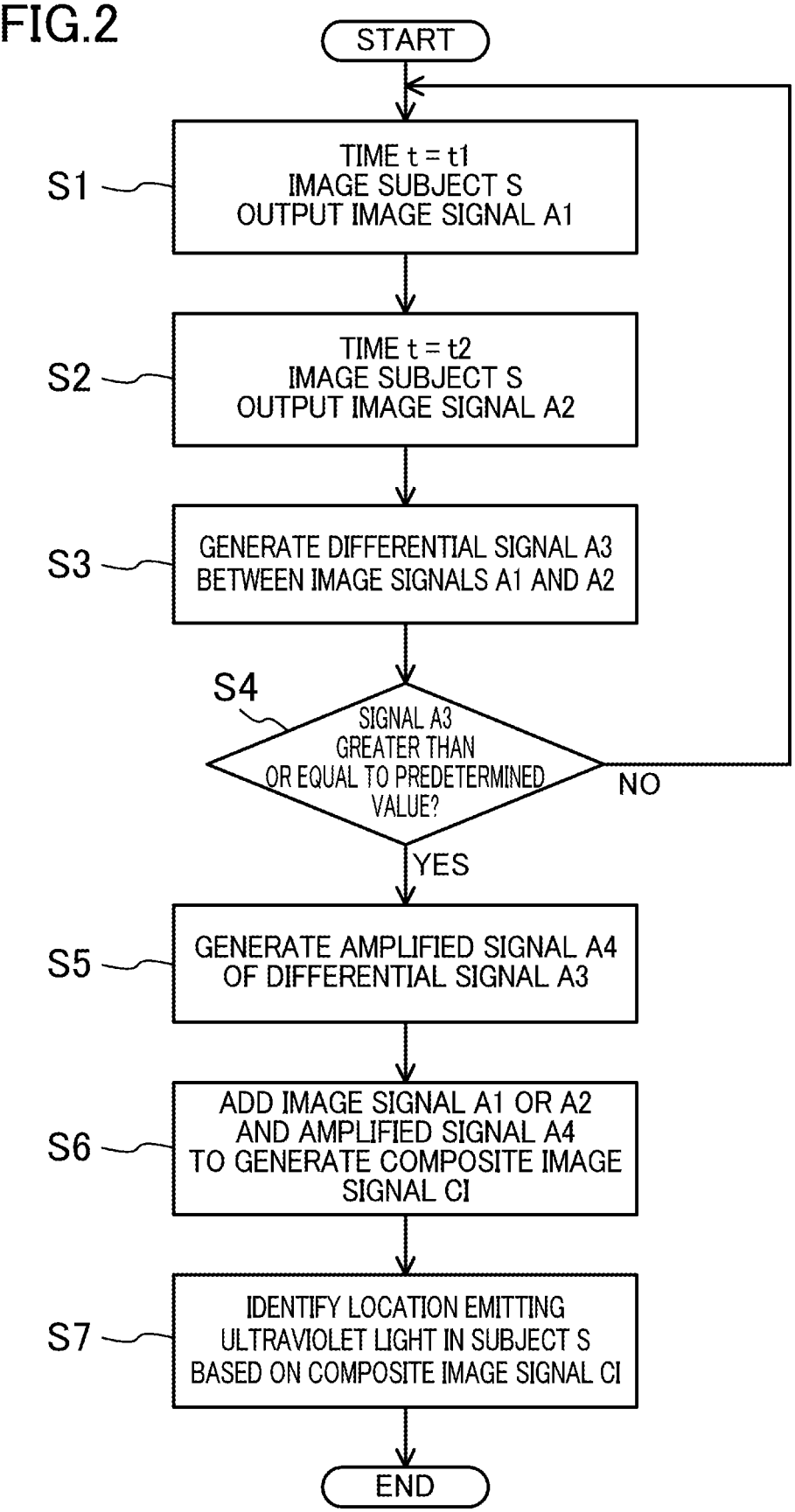
FIG. 2 is a flowchart for identifying the location emitting ultraviolet light according to the first embodiment.

FIG. 2 is a flowchart for identifying the location emitting ultraviolet light according to this embodiment.

At time t=t1, the subject S is imaged using the imaging system 100, in which the image sensor 102 outputs an image signal A1 to the image processor 103 (step S1). In this embodiment, the subject S is a high-pressure hydrogen pipe or an assembly of such pipes laid in a hydrogen station.

At time t=t2 (t1≠t2), the subject S is imaged using the imaging system 100, in which the image sensor 102 outputs an image signal A2 to the image processor 103 (step S2). The image processor 103 generates a differential signal A3 between the image signal A1 and the image signal A2 (step S3).

Next, it is determined whether or not the differential signal A3 is greater than or equal to a predetermined value (step S4). If the differential signal A3 is smaller than the predetermined value, the process returns to step S1 to continue imaging the subject S. On the other hand, if the differential signal A3 is greater than or equal to the predetermined value, the image processor 103 amplifies the differential signal A3 to obtain an amplified signal A4 (step S5). If the differential signal A3 is greater than or equal to the predetermined value, it can be said that there was a change in the intensity of the light received at the image sensor 102 between the times t1 and t2. For example, assume that there is no hydrogen leakage from the hydrogen pipe at time t=t1 and hydrogen leaks out of the high-pressure hydrogen pipe and burns at time t=t2. The information on the hydrogen leakage is then obtainable from the differential signal A3. In this case, the differential signal A3 and the amplified signal A4 are determined to correspond to the image signal mainly associated with the ultraviolet light emitted from the burning hydrogen.

Next, the image processor 103 adds the amplified signal A4 to the image signal A1 to obtain a composite image signal CI (step S6). The differential signal A3 is assumed to be much smaller than the image signals A1 and A2. The differential signal A3 is thus amplified to obtain the amplified signal A4 to balance, for example, the luminance between the amplified signal A4 and the image signal A1 or A2 associated with the background image. The composite image signal CI is input to the display 104, and the location emitting the ultraviolet light, that is, the location from which the hydrogen gas leaks, is identified in the high-pressure hydrogen pipe based on the displayed image (step S7).

According to this embodiment, the image sensor 102 is sensitive to ultraviolet light and visible light. The image sensor 102 thus images the location emitting the ultraviolet light and the background simultaneously to generate and take in image signals. The calculation of the difference between the image signals acquired at different times allows for acquisition of the image signal associated only with the ultraviolet light. Accordingly, the location emitting the ultraviolet light, that is, the location from which the hydrogen gas leaks in this embodiment, can be identified. In addition, the composite image of the image signal associated with the ultraviolet light and the image signal associated with the background, that is, the image signal associated with the visible light is generated and analyzed. This facilitates the identification of the location, from which the hydrogen gas leaks, in the high-pressure hydrogen pipe.

As the lens 101, a lens correcting chromatic aberration for both ultraviolet and visible light is special and expensive. On the other hand, a lens correcting no chromatic aberration is general and less expensive, and thus reduces the overall costs of the system.

In one preferred embodiment, the image signal A1 may be acquired at a time t1 when the pipe is surely normal. That is, the light coming from the subject S at the time t1 is mainly visible light, and the image signal A1 is an image signal mainly associated with the visible light. In this case, if the difference between the image signal An acquired at the time to (n is an integer greater than or equal to 2) and the image signal A1 is equal to or smaller than a predetermined value, it is determined that the image signal An is also an image signal mainly associated with the visible light. Therefore, any of the image signals A1 and An may be used to generate the composite image CI in step S6.

The intensity of the light from the background is different, for example, between day and night, among seasons, or depending on weather or other conditions. A plurality of images may thus be taken and the data of the images may be stored with respect to these variations, when the pipe or pipe assembly is surely normal. The difference between an image signal and the image signals stored in advance may be obtained to determine whether or not the value of the differential signal A3 is greater than or equal to the predetermined value, depending on the current season or the other conditions in daily monitoring.

In step S4, the imaging region may be divided into a plurality of subregions to determine whether or not the value of the differential signal A3 per unit area in each subregion is greater than or equal to a predetermined value. This allows for more reliable determination on the presence or absence of the location emitting the ultraviolet light.

With a sufficiently high intensity, the differential signal A3 is not necessarily amplified. In this case, the step S5 may be skipped so that the composite image signal CI may be generated from the image signal A1 or A2 and the differential signal A3 in the step S6. Between the steps S4 and S5, the differential signal A3 or the imaging region may be divided into a plurality of subregions to determine whether or not the maximum value of the differential signal A3 per unit area in each subregion is greater than or equal to a predetermined value. If the maximum value is greater than or equal to the predetermined value, the step S4 may be skipped.

In view of reducing the influence of the visible light such as external light, the times t1 and t2 may be almost the same.

Second Embodiment

Figure 3:
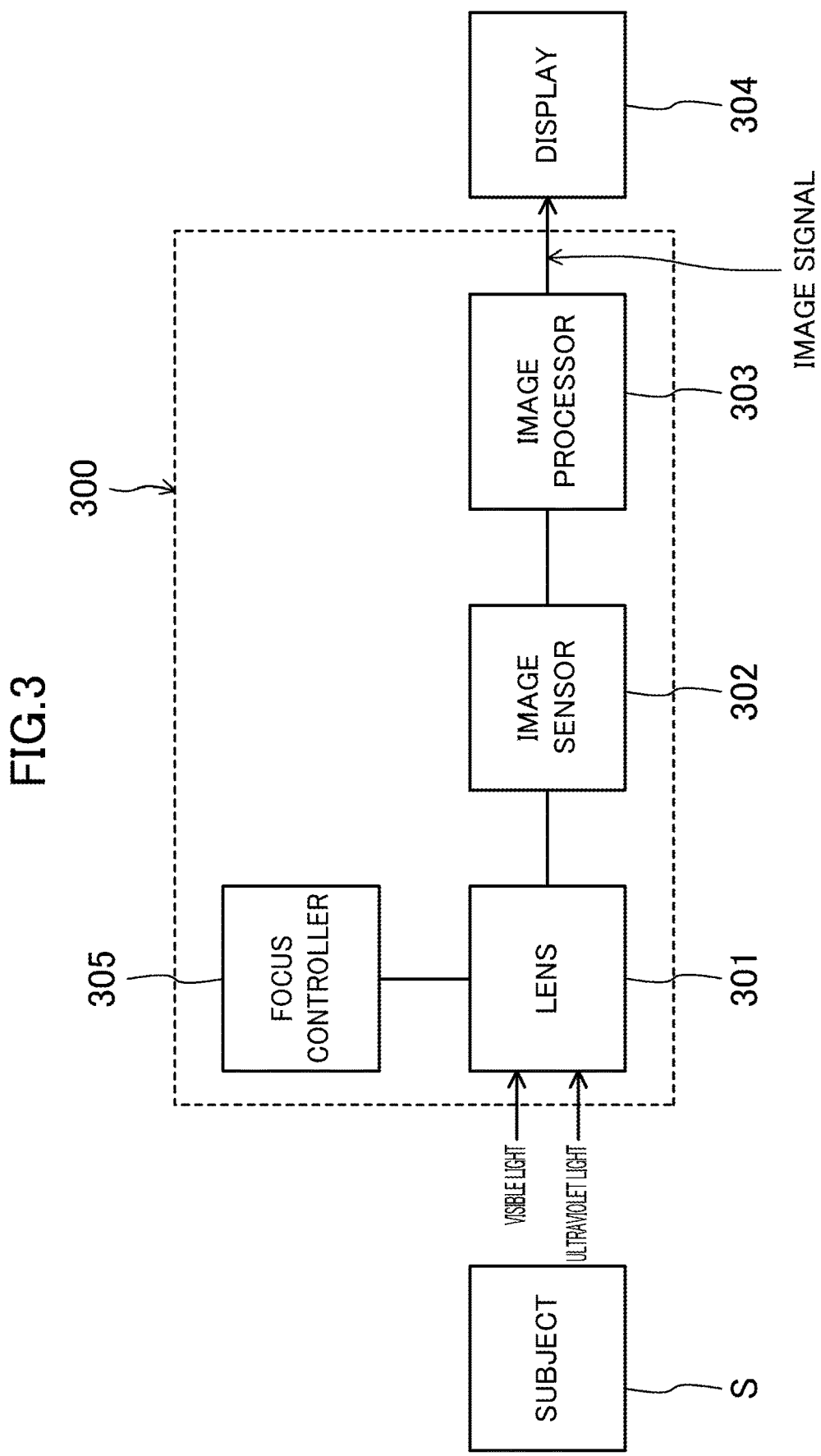
FIG. 3 is a functional block diagram of an imaging system according to a second embodiment of the present invention.

FIG. 3 is a functional block diagram of an imaging system according to this embodiment. Different from the configuration in the first embodiment, the configuration in this embodiment includes a focus controller 305, which controls the position of a lens (condenser) 301 to adjust the focal length. The lens 301 is a lens correcting no chromatic aberration. In this embodiment, a subject S is also a high-pressure hydrogen pipe or an assembly of such pipes laid in a hydrogen station.

The focus controller 305 is used to control the focal point of the lens 301 in accordance with the wavelength of incident light. This allows for more accurate detection of the location emitting ultraviolet light.

FIG. 4 is a flowchart for identifying the location emitting ultraviolet light according to this embodiment.

First, the focal length of the lens 301 is adjusted using the focus controller 305 in accordance with ultraviolet light (step S11). Steps S12 to S16 are the same as the steps S1 to S5 in the flowchart in FIG. 2. Detailed description thereof will thus be omitted. The image signals B1 and B2, differential signal B3, and amplified signal B4 shown in FIG. 4 correspond to the image signals A1 and A2, differential signal A3, and amplified signal A4 shown in FIG. 2, respectively. If the differential signal B3 is greater than or equal to a predetermined value, it can be said that there was a change in the intensity of light received at the image sensor 302 between the times t1 and t2. For example, assume that there is no hydrogen leakage from the hydrogen pipe at time t=t1 and hydrogen leaks out of the high-pressure hydrogen pipe at time t=t2. The information on the hydrogen leakage is then obtainable from the differential signal B3. In this case, the differential signal B3 and the amplified signal B4 correspond to the image signal associated with the ultraviolet light emitted from the burning hydrogen.

Next, the focal length of the lens 301 is adjusted using with the focus controller 305 in accordance with the visible light (step S17). At time t=t3, the subject S is imaged using the imaging system 300, in which the image sensor 302 outputs an image signal B5 to the image processor 303 (step S18).

Next, the image processor 303 adds the amplified signal B4 to the image signal B5 to obtain a composite image signal CI (step S19). The differential signal B3 is assumed to be much smaller than the signal B5. The differential signal B3 is thus amplified to obtain the amplified signal B4 to balance the luminance between the amplified signal B4 and the image signal B5 associated with the background image. The composite image signal CI is input to the display 304, and the location emitting ultraviolet light, that is, the position from which the hydrogen gas leaks, is identified in the high-pressure hydrogen pipe based on the displayed image (step S20).

According to this embodiment, the imaging is performed after adjusting the focal length of the lens 301 in accordance with the ultraviolet light. This provides clear images associated with the ultraviolet light at times t1 and t2. The imaging is also performed after adjusting the focal length of the lens 301 in accordance with the visible light. This provides a clear image associated with the visible light at time t3. Accordingly, in the composite image of these images, the image associated with the ultraviolet light is more clearly distinguishable from the image associated with the visible light. This leads to reliable identification of the location emitting the ultraviolet light.

This will be described in more detail.

The differential signal B3 contains a signal component S1 associated with the visible light and a signal component S2 associated with the ultraviolet light. The signal/noise (S/N) ratio is represented by the following expression (1).

$$\frac{S2}{\sqrt{S1+S2}} \quad \text{[Expression (1)]}$$

Here, the noise component as the denominator contains shot noise of the signal component S1, which corresponds to the square root of S1, and shot noise of the signal component S2, which corresponds to the square root of S2. If the signal component S1 is much greater than the signal component S2, the S/N ratio of the differential signal B3 decreases, as is apparent from Expression 1.

On the other hand, according to this embodiment, the image signal is acquired after adjusting the focal length of the lens 301 in accordance with the ultraviolet light. The visible light component is thus taken out of the subject S into the light receiving surface (not shown) of the image sensor 302, while not being focused. That is, the intensity of the visible light incident on each pixel of the image sensor 302 decreases. As viewed in each pixel unit, the signal component S1 contained in the differential signal B3 can decrease to improve the S/N ratio of the differential signal B3. This increases the intensity of the signal associated with the ultraviolet light in the composite image signal CI, and thus allows for reliable identification of the location emitting the ultraviolet light.

While the focal point of the lens 301 is adjusted using the focus controller 305 in the second embodiment, the adjustment may be performed manually. The amount of focus adjustment of the lens 301 with respect to the ultraviolet light may be estimated in advance based on the wavelength of ultraviolet light and the design parameters of the lens 301. This amount may be used when driving the focus controller 305.

In this embodiment, the image focused on the ultraviolet light is acquired at time t1, and then the image focused on the visible light is acquired at time t3. The image focused on the visible light may be acquired before the image focused on the ultraviolet light. That is, the time t3 may be prior to the time t1.

An example has been described where the imaging systems according to Embodiments 1 and 2 are applied to monitoring of hydrogen gas leakage or resultant fire in a hydrogen station. The imaging system according to the present invention is also applicable for other purposes. For example, the imaging system is also applicable to discharge detection in a power plant.

The imaging system according to the present invention detects weak ultraviolet light even in a bright place such as outdoors, and is thus applicable to monitoring of a malfunction in a facility.

DESCRIPTION OF REFERENCE CHARACTERS 100, 300 Imaging System
101, 301 Lens (Condenser)
102, 302 Image Sensor
103, 303 Image Processor
104, 304 Display
305 Focus Controller
A1, A2, B1, B2, B5 Image Signal Acquired at Predetermined Time
A3, B3 Differential Signal Associated with Ultraviolet Light
A4, B4 Amplified Signal Associated with Ultraviolet Light
CI Composite Image Signal (First or Second Composite Image Signal)
S Subject

What is claimed is:

1. An imaging system comprising:
an image sensor sensitive to ultraviolet light and visible light;
a lens configured to focus light from a subject onto the image sensor; and
an image processor configured to process image signals output from the image sensor, wherein
the image processor
acquires a differential signal between an image signal output from the image sensor at a first time under illumination containing the visible light and an image signal output from the image sensor at a second time under illumination containing the visible light,
determines that the differential signal contains a signal associated with the emission of ultraviolet light if the differential signal is greater than or equal to a predetermined value, and
generates a first image signal based on the differential signal.

2. The imaging system of claim 1, wherein
the image processor further generates a first composite image signal of the image signal output from the image sensor at the first time and the first image signal or an amplified first image signal.

3. The imaging system of claim 1, further comprising:
a focus controller configured to control a position of the lens to adjust a focal length of the lens with respect to light with different wavelengths, wherein
the focus controller controls the position of the lens to match the focal length of the lens to the ultraviolet light at the first and second times, and controls the position of the lens to match the focal length of the lens to the visible light at a third time under illumination containing the visible light, and
the image processor further generates a second composite image signal of an image signal output from the image sensor at the third time and the first image signal or an amplified first image signal.

4. The imaging system of claim 2, further comprising:
a display configured to display an image of the subject based on the first composite image signal.

5. The imaging system of claim 3, further comprising:
a display configured to display an image of the subject based on the second composite image signal.

6. The imaging system of claim 1, wherein
the ultraviolet light has a wavelength within a range from 200 nm (inclusive) to 400 nm (exclusive), while the visible light has a wavelength within a range from 400 nm to 700 nm.

7. The imaging system of claim 2, wherein
the ultraviolet light has a wavelength within a range from 200 nm (inclusive) to 400 nm (exclusive), while the visible light has a wavelength within a range from 400 nm to 700 nm.

8. The imaging system of claim 3, wherein
the ultraviolet light has a wavelength within a range from 200 nm (inclusive) to 400 nm (exclusive), while the visible light has a wavelength within a range from 400 nm to 700 nm.

9. The imaging system of claim 4, wherein
the ultraviolet light has a wavelength within a range from 200 nm (inclusive) to 400 nm (exclusive), while the visible light has a wavelength within a range from 400 nm to 700 nm.

10. The imaging system of claim 5, wherein
the ultraviolet light has a wavelength within a range from 200 nm (inclusive) to 400 nm (exclusive), while the visible light has a wavelength within a range from 400 nm to 700 nm.

11. A method of identifying a location emitting ultraviolet light using an imaging system including at least:
an image sensor sensitive to ultraviolet light and visible light;
a lens configured to focus light from a subject onto the image sensor; and
an image processor configured to process image signals output from the image sensor, the method comprising:
imaging a subject to acquire ones of the image signals at a first time under illumination containing the visible light and a second time under illumination of the visible light using the image sensor;
obtaining a differential signal between the ones of the image signals acquired at the first and second times using the image processor;
determining whether or not the differential signal is greater than or equal to a predetermined value using the image processor;
determining that the differential signal contains a signal associated with the ultraviolet light if the differential signal is greater than or equal to a predetermined value;
generating a first image signal based on the differential signal containing the signal associated with the emission of ultraviolet light using the image processor; and
identifying the location associated with the emission of the ultraviolet light in the subject using the image processor, based on the first image signal.

12. The method of claim 11, wherein
the location emitting the ultraviolet light is identified in the subject using the image processor, based on a first composite image signal of the first image signal or an amplified first image signal and the one of the image signals acquired at the first time.

13. The method of claim 11, further comprising:
adjusting a position of the lens to match a focal length of the lens to the ultraviolet light at the first and second times;
adjusting the position of the lens to match the focal length of the lens to the visible light at a third time under illumination containing the visible light; and
imaging the subject to acquire an image signal at the third time using the image sensor, wherein
the location of the emission of the ultraviolet light is identified in the subject using the image processor, based on a second composite image signal of the first image signal or an amplified first image signal and the image signal acquired at the third time.

14. The method claim 11, wherein
the ultraviolet light has a wavelength within a range from 200 nm (inclusive) to 400 nm (exclusive), while the visible light has a wavelength within a range from 400 nm to 700 nm.

15. The method claim 12, wherein
the ultraviolet light has a wavelength within a range from 200 nm (inclusive) to 400 nm (exclusive), while the visible light has a wavelength within a range from 400 nm to 700 nm.

16. The method claim 13, wherein
the ultraviolet light has a wavelength within a range from 200 nm (inclusive) to 400 nm (exclusive), while the visible light has a wavelength within a range from 400 nm to 700 nm.

17. The imaging system of claim 1, wherein
the imaging of the subject using the image sensor is continued if the differential signal is smaller than a predetermined value.

18. The method of claim 11, further comprising:
determining, by the image processor, whether or not the differential signal is equal to or greater than the predetermined value, and continuing with the imaging of the subject using the image sensor if the differential signal is smaller than the predetermined value.

\* \* \* \* \*